(No Model.)
G. H. TALBOT.
WHIFFLETREE.
No. 524,358.  Patented Aug. 14, 1894.
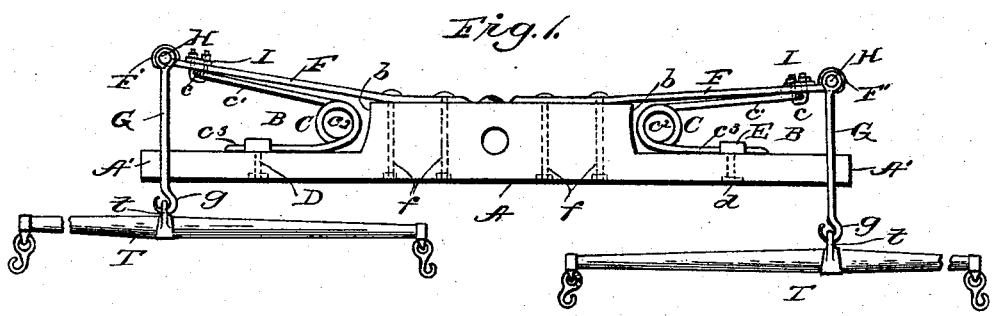
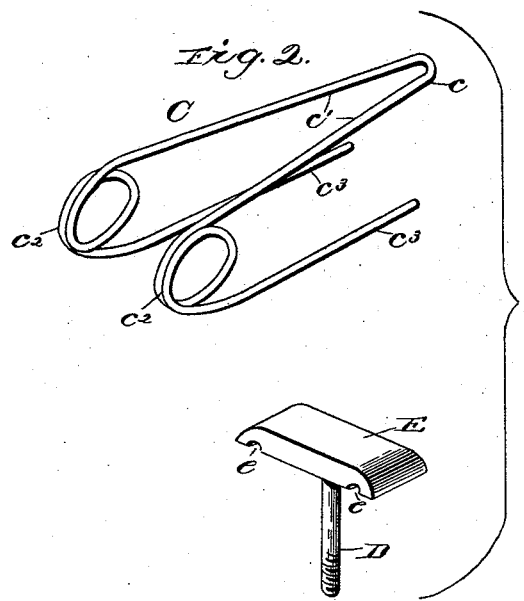
Witnesses:
J. M. Fowler Jr.
J. H. Jochum Jr.
Inventor:
George H. Talbot,
By Collamer & Co.,
Attorneys.

UNITED STATES PATENT OFFICE.

GEORGE H. TALBOT, OF LANSING, MICHIGAN.

WHIFFLETREE.

SPECIFICATION forming part of Letters Patent No. 524,358, dated August 14, 1894.

Application filed June 11, 1894. Serial No. 514,218. (No model.)

*To all whom it may concern:*

Be it known that I, GEORGE H. TALBOT, a citizen of the United States, and a resident of Lansing, Ingham county, State of Michigan, have invented certain new and useful Improvements in Whiffletree-Hooks; and my preferred manner of carrying out the invention is set forth in the following full, clear, and exact description, terminating with a claim particularly specifying the novelty.

This invention relates to carriages and wagons, and more especially to the doubletrees and singletrees thereof; and the object of the same is to effect certain improvements in devices of this character.

To this end the invention consists in the specific details of construction hereinafter described and claimed, and as illustrated in the drawings, wherein—

Figure 1 is a plan view of this improved doubletree showing the spring at one end under tension and the spring at the other end in its normal position. Fig. 2 is a perspective detail of parts.

In the said drawings, the letter A designates the body of the doubletree which at each end is provided with a cutaway portion B in its rear edge which extends from the angle or shoulder $b$ out to the end of the doubletree so as to form a reduced extension A' of the latter. Within this cutaway portion or recess is located a stiff coiled spring C composed of a single piece of wire bent upon itself at $c$, having its two arms $c'$ carried parallel with each other and formed into two parallel and aligned rings or eyes $c^2$ standing on edge at the inner end of the recess B adjacent its shoulder $b$, and having its two ends or extremities $c^3$ resting against the rear face of the extension A' within this recess B.

D is a bolt passing through the extension A' and receiving a nut or tap $d$ at its front end, while its rear end is formed with a head E preferably having two notches $e$ as seen in Fig. 2. The ends $c^3$ of the coiled spring pass astride the bolt D, under the head E, and rest in the notches $e$, and by screwing up the nut $d$ these two ends of the spring are tightly drawn against the rear side of the extension A' within the recess B.

F is a leaf spring secured at its inner end in any suitable manner as by bolts $f$ to the body A inside of or beyond the inner end $b$ of the recess B, and the body of this spring extends beyond the shoulder $b$ to a point nearly flush with the end of the extension A' where it is curled over to the rear into an eye F'.

G is an ordinary clevis whose body stands astride the extension A', whose front end has a hook $g$ to which the singletree is pivotally attached, and whose rear end is connected by a bolt H passing through the eye F' above mentioned. Said leaf spring F stands in rear of the two arms $c'$ of the coiled spring where they are bent upon themselves as at $c$, and is rigidly connected therewith in any suitable manner as by clips I. It will thus be seen that by loosening the nut on the bolt D and sliding the ends $c^3$ of the spring C under the head E of said bolt, the eyes $c^2$ can be coiled more tightly or opened to a greater extent, whereby the tension of the spring will be adjusted as desired, since the bend $c$ of the spring is rigidly connected with the leaf spring F by the clip I.

All parts of this device are of the desired sizes, shapes, materials, and proportions; and such changes in the specific details of construction may be made as do not depart from the principle of my invention.

In operation, an eye $t$ at the rear of the center of the singletree T is connected with the hook $g$ at the front end of the clevis G, and the horses are started. The forward pull on the traces, draws the singletree forward, and each eye $t$ thereof draws its clevis G slightly forward and bends the outer end of the leaf spring F toward the extension and this motion also bends the arms $c'$ of the coiled spring C toward the extension—the latter spring yielding in its coils or eyes $c^2$ as will be understood. However, the fact that the coils $c^2$ stand on edge between and in contact with the extension A' and spring F when the latter is under tension, causes them to form a much stronger spring than if arranged in helical form between these parts; and the further fact that the coils are located near the shoulder $b$ causes them to prevent the leaf-spring F from breaking over the corner of the shoulder.

I am aware that it is old to employ a leaf spring attached to the rear face of a whiffletree and to connect its extremity with a clevis which passes astride of the whiffletree and carries a hook or attaching means for connecting the trace therewith, and a helical spring interposed between the leaf spring and whiffletree, and such construction I do not claim; my present invention consisting in the addition to this structure of a coiled spring standing wholly within a recess which is provided in the rear edge of the doubletree for this purpose, and co-operating with the leaf spring to strengthen the same and prevent a sudden pull from breaking it over the angle $b$, together with the means set forth above for adjusting the tension of said coiled spring.

Having thus described my invention, with its advantages, and stated the portions thereof to which I make no claim, what I do claim as new and of my present invention is—

In a doubletree, the combination with the doubletree body having a recess in its rear edge at its end so as to form a reduced extension, a leaf spring secured to the rear edge of the body of the doubletree and standing in rear of said recess, and a clevis pivoted to the outer end of the leaf spring, passing astride the extension, and having a hook; of a coiled spring consisting of a single piece of spring wire bent upon itself and rigidly connected with the outer end of the leaf spring, its two arms then extending toward the center of the doubletree and formed into two parallel eyes at the inner end of said recess, and its two ends then extending outward and standing against the rear face of said extension, said ends being adjustable longitudinally thereon under the T-head of a bolt passing through the extension and between said arms whereby the bolt can be loosened and the ends of the spring moved under its head to adjust the tension of the spring, substantially as and for the purpose set forth.

In testimony whereof I have hereunto subscribed my signature on this the 1st day of June, A. D. 1894.

GEORGE H. TALBOT.

Witnesses:
GEORGE G. BEEBE,
HERMAN H. HOFFMAN.